United States Patent [19]

Schonfeld et al.

[11] 4,195,679

[45] Apr. 1, 1980

[54] COMPOSITION AND PRODUCT WITH IMPROVED ADHESION BETWEEN A METAL MEMBER AND A CONTIGUOUS CURED RUBBER SKIM STOCK

[75] Inventors: Steven E. Schonfeld, Akron; Frederick J. Ravagnani, Uniontown, both of Ohio

[73] Assignee: The Firestone Tire & Rubber Company, Akron, Ohio

[21] Appl. No.: 956,944

[22] Filed: Nov. 2, 1978

Related U.S. Application Data

[63] Continuation-in-part of Ser. No. 859,617, Dec. 12, 1977, abandoned.

[51] Int. Cl.$^2$ .............. B32B 15/06; B32B 31/26; C08C 19/20; C08F 8/34
[52] U.S. Cl. ................ 152/359; 152/356 R; 156/110 A; 156/124; 260/3; 260/42.24; 428/462; 428/463; 428/465; 428/469; 428/472; 428/539
[58] Field of Search .......... 260/3, 42.24; 428/462, 428/463, 465, 469, 472, 539; 156/124, 110 A; 152/356 R, 359

[56] References Cited

U.S. PATENT DOCUMENTS

| | | | |
|---|---|---|---|
| 3,514,370 | 5/1970 | Canevari | 428/462 |
| 3,650,708 | 3/1972 | Gallagher | 428/462 X |
| 3,897,583 | 7/1975 | Bellamy | 428/462 X |
| 3,951,894 | 4/1976 | Whelan | 260/42.24 X |
| 3,976,624 | 8/1976 | Inouye et al. | 428/462 X |
| 3,991,130 | 11/1976 | Cowell et al. | 428/465 X |
| 4,137,359 | 1/1979 | Bak et al. | 428/462 X |
| 4,154,911 | 5/1979 | Bak et al. | 428/462 X |

*Primary Examiner*—Harold Ansher

[57] ABSTRACT

This invention is directed to a rubber skim stock and a product containing the skim stock having improved adhesion between a brassed metal member and contiguous rubber skim stock. The invention lies in the discovery that improved rubber-to-metal adhesion, and adhesion retention, can be obtained by adding to an otherwise conventional rubber skim stock composition appropriate amounts of sulfides of copper.

In the practice of this invention, a sulfide of copper is mixed into a rubber skim stock composition, which composition is brought into contiguous relationship with a brassed metal member in the unvulcanized composition followed by vulcanization to yield the end product.

12 Claims, No Drawings

# 4,195,679

COMPOSITION AND PRODUCT WITH IMPROVED ADHESION BETWEEN A METAL MEMBER AND A CONTIGUOUS CURED RUBBER SKIM STOCK

RELATED APPLICATION

This application is a continuation-in-part of our co-pending application, U.S. Ser. No. 859,617 filed Dec. 12, 1977 now abandoned.

BACKGROUND OF THE INVENTION AND PRIOR ART

In the production of rubber articles such as hose, pneumatic tires or power transmission belts such as V-belts, toothed positive drive belts, etc., it is generally necessary to reinforce the rubber or elastomeric product. In the past, textile materials have been employed for this purpose. However, wire cord has been found to be more desirable under certain conditions of use, for example, in pneumatic tires of the radial ply type. Maximum reinforcement of the rubber is obtained when maximum adhesion is produced and retained between the laminate of a contiguous rubber skim stock and the metal reinforcing element as used to form a unitary structure. Of equal importance is the requirement that, for example, the laminate of the reinforcing metal element and contiguous rubber remain in a bonded relationship with each other throughout the useful life of the reinforced structure in which the laminate is used.

To achieve satisfactory rubber-to-metal bonding, numerous methods have been developed. For example, U.S. Pat. No. 2,720,479 describes a system wherein a phenolic resin and a brominated isoolefin-polyolefin interpolymer are dissolved in a suitable liquid carrier and the resulting adhesive composition is spread on rubber which is to be bonded to metal. The rubber and metal are subsequently pressed together and vulcanized. U.S. Pat. No. 2,581,920 also describes the use of halogenated polymers to bond rubber to metal.

In U.S. Pat. No. 3,517,722 to Endter et al., a rubber-metal adhesion system is described which involves formation of a resorcinol-formaldehyde resin at the interface between the rubber and the metal, thereby bonding these members together. In forming the resin, compounds capable of liberating the methylene precursor are added to resorcinol in the rubber stock. Upon vulcanization, the methylene and resorcinol react to form the resorcinol-formaldehyde resin.

According to U.S. Pat. No. 3,846,160, the adhesion force between steel cord and rubber is enhanced by applying a mineral oil solution containing, for example, an organic acid salt of a higher aliphatic amine to zinc plated or brass plated steel cord.

The adhesion of rubber to metal such as wire tire cord is improved according to U.S. Pat. No. 3,847,727 by incorporating a halogenated quinone and the condensation product of resorcinol and acetaldehyde into the rubber prior to application to the metal and vulcanization of the composite.

The disclosure of U.S. Pat. No. 3,903,026 teaches the preparation of a rubber composition having improved metal adhesion properties even after thermal aging; this is disclosed to be achieved by compounding cobalt carboxylate and magnesium oxide (0.1 to 4 phr) into rubber.

U.S. Pat. No. 3,738,948 is directed to a fiber reinforced rubber composition that can be utilized in tire construction. The fiber can be glass, nylon, rayon or metal wire. The composition is disclosed to contain a finely divided silica, hexamethylene tetramine, resorcinol and a compatible metal soap such as calcium stearate. Similar compositions containing discontinuous fiber filaments are disclosed in U.S. Pat. No. 3,746,669.

Pages 17 and 25 of the Vanderbilt Rubber Handbook, published by R. T. Vanderbilt, 1968, indicate that the presence of copper in rubber is harmful to said rubber in that it functions as a rubber oxidation catalyst.

Rubber Age, October 1975, pages 31 to 36, "Evaluation of Resotropin" by Cunningham and Hart. Resotropin, the reaction product of equimolar quantities of resorcinol and hexamethylene tetramine, is disclosed to be a rubber adhesion promoter for use with brassed steel wire cord. Improved cure, including higher degrees of cure are alleged to be achieved with equal scorch resistance.

DESCRIPTION OF THE INVENTION

This invention relates to a rubber skim stock and a product containing the skim stock wherein the invention yields improved adhesion between a contiguous rubber skim stock and a brassed metal member. The invention lies in the discovery that improved rubber-to-metal adhesion, and adhesion retention, can be obtained by adding to an otherwise conventional rubber skim stock composition appropriate amounts of a sulfide of copper.

In the practice of this invention, a sulfide of copper is mixed into a rubber skim stock composition, as described below, this composition is then brought into contiguous relationship with at least one brassed metal member in the unvulcanized composition, followed by vulcanization to yield the end product.

The rubber compound is described with all ingredients based on the total rubber component in the compound being 100 parts by weight.

DETAILED DESCRIPTION OF THE INVENTION

A skim stock material for use in wire belts of tires was mixed in an 1100 cc Banbury mixer. Mix times were about 7 minutes with a final Banbury temperature of 325° F. This stock was then final mixed on a mill at a temperature below 220° F. The addition of the copper sulfides was done on the final mill.

Typical properties of a reinforcing belt skim stock include hardness values of over 60 shore A, 300% modulus values of at least 1200 PSI, and accompanying elongations at break of at least 250%. The known uses for such a stock would include preparation of belt skims for belted tires such as radials or bias belted. In addition this stock could be used in wire reinforced continuous belts or any other application where the rubber would come in contact with the brass plated steel wire.

The level of copper sulfides which were found to give acceptable improvements in adhesion and adhesion retention between rubber skim stock and brass coated wire was preferably between 2 and 8 parts of both the CuS and $Cu_2S$ per 100 parts of rubber. The levels of copper sulfides necessary to maintain adhesion in the stock appear to be directly related to the nature of the particular rubber stock, and can vary from about 0.5 to about 15 parts per 100 parts of rubber.

All testing of the wire-rubber composites was done in T-adhesion pads prepared by placing 60 gage slabs of uncured skim stock on 50 gage fiber reinforced backing. Sample width was ½ inch. Clean, brass wires were placed between two pads of the reinforced skim stocks with the wires in contact with the uncured skim at ½ inch intervals. The pads were placed in a mold and were cured for 30 minutes at 300° F. Testing was done on an Instron Universal tester at 10 inches per minute at 230° F. Steam bomb aging was done in a pressure vessel at 1 atmosphere, 300° F., and in a saturated steam atmosphere. Humidity chamber aging was done at 90% relative humidity and 95° F.

The following Examples are representative. The composition component parts are expressed in parts per hundred rubber, phr, unless otherwise specified. These components are broadly within the ranges set out below:

Masterbatch
100 parts rubber
20 to 90 phr carbon black
0 to 20 phr extender oil
1 to 12 phr zinc oxide
0.1 to 5 phr antioxidant
0 to 5 phr stearic acid
0.1 to 5 phr resorcinol
Mill Mix
0 to 10 phr sulfur
0.1 to 3 phr N-(cyclohexylthio) phthalimide
1 to 5 phr 95/5 hexamethylene tetramine/stearic acid preblend
0.2 to 5 phr n-oxydiethylene benzothiazole 2-sulfenamide
0.5 to 15 phr of, for example, $Cu_2S$ or CuS as copper sulfide, and
0.3 to 2.0 phr extender oil.

Polymeric reinforcing resins that can be incorporated into our skim stock composition to improve the modulus properties of our cured stock can be added together with an extender oil, preferably medium process, if needed to maintain processability. Specific polymeric reinforcing resins that can be utilized in the practice of our invention include the phenol-formaldehyde resins, hexamethylenetetramine-formaldehyde, urea-formaldehyde and the like as illustrated in, for example, J. K. Stille, Introduction to Polymer Chemistry, John Wiley & Sons, Inc., 1962, Section 6.3, pages 102 to 106. Our preferred polymeric resin is the 1:1 molar reaction product of resorcinol and hexamethylenetetramine known also as "resotropin". Selected mixtures of more than one of such polymeric resins can be utilized.

The cupric sulfide (CuS) and cuprous sulfide ($Cu_2S$) adhesion and adhesion retention promoter selected in the practice of the present invention is not critical; it can be any of those commercially available, for example, such as those provided by Glidden Metals, a division of SCM Corporation; these compounds are described in detail in Bulletins Nos. 2315 (9-9-75) and 2313 (7-6-75) respectively. These copper sulfides can be routinely prepared by known procedures.

Specific detailed examples of useful compositions within the ranges set out above follow:

EXAMPLE 1

The following composition was blended in a 1100 cc. Banbury mixer for about 7 minutes with a final Banbury temperature of 325° F.
(1) 100 parts of natural rubber
(2) 50 phr carbon black
(3) 7.5 phr zinc oxide (4) 3 phr antioxidant (1,3-dimethyl butyl)-N'-phenyl-p-phenylenediamine
(5) 0.5 phr stearic acid
(6) 3.3 phr extender oil, and
(7) 2 phr resorcinol.

The masterbatch resulting from the preceding blending was then roll mill mixed with the following composition at a temperature below 220° F.
(a) 3.5 phr of an 80/20 sulfur/oil preblend
(b) 1.0 phr N-(cyclohexylthio)-phthalimide as retarder
(c) 0.6 phr n-oxydiethylene-benzothiazole-2-sulfenamide as accelerator
(d) 2.2 phr 95/5 hexamethylenetetramine/stearic acid preblend.

T-adhesions to brass coated wire for the resulting mill mix were determined at 230° F. The samples were cured 30' at 300° F. Percent coverage was determined visually. The control of Table I was the above mix.

TABLE I

| | Control | Control + 2 phr $Cu_2S$ | Control + 8 phr $Cu_2S$ |
|---|---|---|---|
| Monsanto Rheometer - 300° F. | | | |
| Time to TS (2) | 7.0 | 6.8 | 6.9 |
| Time to TC (90) | 21.2 | 20.0 | 18.4 |
| Ultimate Torque, dN M | 47.8 | 45.1 | 39.9 |
| R. T. Ring Tensile - 23' Cure | | | |
| 300% Modulus, (PSI) | 2610 | 2570 | 2260 |
| Tensile Strength, (PSI) | 2950 | 2880 | 2420 |
| Elongation, (%) | 340 | 330 | 320 |
| R. T. Ring Tensile - 23' Cure - Aged 4 Days at 212° F. | | | |
| Tensile Strength, (PSI) | 1480 | 1550 | 1510 |
| Elongation, (%) | 160 | 170 | 220 |
| Firestone Flexometer ASTM D 623/Method B | | | |
| Initial Shore A | 72 | 70 | 67 |
| Hot Shore A | 70 | 66 | 61 |
| % Deflection | 11.3 | 10.7 | 13.3 |
| Running Temp., (°F.) | 220 | 220 | 240 |
| T-Adhesion to W152 Brass at 230° F. | | | |
| Unconditioned | 145(100) | 142(100) | 140(100) |
| Steam Bomb - 1 Hr., 300° F. | 119(70) | 110(80) | 83(60) |
| Humidity Chamber - | | | |
| 14 Days | 75(20) | 69(40) | 132(90) |
| 60 Days | 20(0) | 46(0) | 95(50) |
| 90 Days | 22(0) | 47(0) | 81(70) |
| 120 Days | 23(0) | 46(0) | 75(40) |
| 150 Days | 32(0) | 43(0) | 66(40) |

This Example I composition components can be varied within the following ranges:

EXAMPLE II

A masterbatch was prepared by mixing, in an 1100 cc. Banbury mixer the following formulation for about 7 minutes with a final Banbury temperature of 325° F. This stock was then final milled on a mill at a temperature below 220° F. The addition of the resotropin and adhesion promoter was done on the final mill.

Masterbatch Formulation:
(1) 100 parts natural rubber
(2) 50 phr carbon black as reinforcing agent
(3) 4 phr extender oil as processing aid
(4) 7.5 phr zinc oxide as activator and reinforcing pigment
(5) 0.5 phr stearic acid as internal lubricant stabilizer
(6) 3 phr antioxidant (1,3-dimethylbutyl)-N'-p-phenylenediamine)

The masterbatch resulting from this Banbury mixing was then roll mill mixed with 2.8 phr sulfur as curative, 0.7 phr extender oil, 0.9 phr N-oxy-diethylene benzothiazole 2-sulfenamide as accelerator, 2.2 phr resotropin, 8 phr Cu₂S as adhesion retention promoter for brass coated wire and as retarder, 0.3 phr N-(cyclohexylthio)-phthalimide; the sulfur and extender oil were mill mixed as an 80/20 sulfur/oil preblend.

In Table II which follows, the masterbatch was present at 161 parts for each experiment; the mill mix components were as above designated.

TABLE II

| Stock Aging Time (Days) | Control | Control + 8 PHR Cuprous Sulfide | Control + 8 PHR Cupric Sulfide |
|---|---|---|---|
| 0 | 136(90) | 32(100) | 140(100) |
| 14 | 135(90) | 140(100) | 151(100) |
| 60 | 57(30) | 93(40) | 80(60) |
| 90 | 42(0) | 75(60) | 71(40) |
| 120 | 46(0) | 90(70) | 79(50) |

TABLE III

| | Control | Control + 8 PHR Cu₂S | Control + 8 PHR CuS |
|---|---|---|---|
| Masterbatch of Example II | 161 | 161 | 161 |
| Resotropin | 2.2 | 2.2 | 2.2 |
| 80/20 Sulfur/oil preblend | 3.5 | 3.5 | 3.5 |
| Accelerator of Example III | .9 | .9 | .9 |
| Cupric Sulfide | — | — | 8.0 |
| Cuprous Sulfide | — | 8.0 | — |
| Total Parts | 167.6 | 175.6 | 175.6 |
| Monsanto Rheometer 300° F. rpm 1° Arc | | | |
| Scorch time (min. to TS (2) ) | 6.1 | 7.8 | 7.3 |
| Min. to opt. cure Min. to YD (90) | 15.3 | 16.4 | 21.5 |
| Max. Torque DN-M | 43.9 | 36.0 | 41.0 |
| Room Temp. Ring Tensile Slabs Cured 23' at 300° F. | | | |
| Modulus at 300% Elongation (PSI) | 2530 | 1930 | 2160 |
| Tensile at Break (psi) | 2700 | 2300 | 2630 |
| Ultimate Elongation (%) | 320 | 340 | 360 |
| 23' At 300° F. Slabs After Aging 4 Days in 212° F. Oven | | | |
| Tensile at Break (psi) | 690 | 610 | 680 |
| Ultimate Elongation | 80 | 120 | 130 |
| T-Adhesion to Brass Plated 1 × 5 (w 152) Wire @ 230° F., | | | |
| Test Pieces | | | |
| Unconditioned | 136(90) | 132(100) | 140(100) |
| After 1 Hr. in 300° F. steam | 84(50) | 96(60) | 104(50) |
| After Conditioning in the Cured State in 90% R.H., 95° F. | | | |
| 14 Days | 135(90)* | 140(10)* | 151(10)* |
| 2 months | 57(30) | 93(40) | 80(60) |
| 3 months | 42(0) | 65(60) | 71(40) |
| 4 months | 46(0) | 90(70) | 79(50) |
| 5 months | 43(0) | 74(60) | 63(20) |

*% Coverage as visually determined

This Example II can be varied within the following practical composition component ranges:
  Masterbatch
  100 parts rubber
  20-90 phr carbon black
  0-20 phr extender oil
  3-12 phr zinc oxide
  0.1 to 5 phr antioxidant
  0 to 5 phr stearic acid
  Mill Mix
  1.0 to 10 phr curative
  0 to 3 phr retarder
  0.2 to 5 phr accelerator
  0.5 to 15 phr of copper sulfide
  0.5 to 12 phr polymeric reinforcing resin Mill mixing was carried out into the masterbatch on a two roll 20" mill followed by sheeting out the product at a thickness of 60 gage for adhesion testing. The product was cured for 23 minutes at 300° F.

EXAMPLE III

The following composition was blended in a Banbury mixer:
(1) 100 phr natural rubber
(2) 55 phr carbon black
(3) 7.5 phr zinc oxide
(4) 2.0 phr antioxidant
(5) 0.5 phr stearic acid
(6) 2.0 phr pine tar The masterbatch resulting from the preceding was then roll mill mixed with each of the following compositions A (control) and B (control) plus 2 phr cuprous sulfide:

| | A | B |
|---|---|---|
| (1) | 7.5 phr of an 80/20 sulfur/oil preblend | Same |
| (2) | 0.6 phr NOBS Special accelerator | Same |
| (3) | 0.4 phr PVI retarder | Same |
| (4) | 1 phr Santoflex 13 antioxidant | Same |
| (5) | | 2 phr cuprous sulfide |

T-adhesions to brass coated wire for the resulting A and B mill mixes were determined at 230° F. The samples were cured 30' at 300° F. (% coverage). Percent coverage was determined visually. The following T-adhesion data was determined to brass plated wire:

| | A | B |
|---|---|---|
| Unconditioned | 153(100) | 157(100) |
| After 1 hr. in 300° F. Steam | 57(0) | 44(0) |
| After conditioning in the cured state in 90% R. H., 95° F. environment | | |
| 14 days | 163(100) | 169(100) |
| 60 days | 104(80) | 109(80) |
| 90 days | 81(60) | 96(80) |
| 120 days | 73(30) | 107(70) |
| 150 days | 95(70) | 125(100) |

This Example III composition components can be varied within the following ranges:
  Masterbatch
  100 parts rubber
  20 to 90 phr carbon black
  3 to 12 phr zinc oxide
  0.1 to 5 phr antioxidant
  0 to 5 phr stearic acid
  0 to 20 phr pine tar
  Mill Mix
  3 to 10 phr of an 80/20 sulfur/oil preblend
  0 to 4 phr of an antioxidant
  0 to 2 phr of a vulcanization retarder
  0.2 to 2 phr of an accelerator
  0.5 to 15 phr of copper sulfide The retarder component functions as a prevulcanization inhibitor and can be, for example, Santogard PVI by Monsanto, N-(cyclohexylthio)-phthalimide.

The testing of our stabilized and adhesion retaining skim stocks was done on T-adhesion pads prepared by placing 60 gage slabs of uncured skim stock on 51 gage fiber reinforced backing. Sample width was ½ inch. Clean brass coated wires were placed between two pads of the reinforced skim stock with the wires in contact with the uncured skim at ½ inch intervals. The pads were placed in a mold and were cured for 30 minutes at 300° F. Testing was done on an Instron Universal Tester at 10 inches per minute and 230° F. Steam bomb aging of the samples was done in a pressure tight bomb at 1 atmosphere pressure, 300° F., and a saturated steam atmosphere.

The unconditioned T-adhesion results set forth in the preceding examples is in lbs./in. and % coverage as visually determined. The conditioned T-adhesion results are determined after 1 hour in 300° F. steam in lbs./in. with % coverage being determined visually.

DETAILED T-ADHESION TEST PROCEDURE

1. Using a Clicker machine and a 6×½ inch die, prepare an adequate number of calendered and control stock samples for pad building.
2. Use one piece of calendered fabric backing (0.051").
3. Ply one piece of control rubber stock (0.060") onto the fabric backing.
4. Place sample in building jig with fabric side down.
5. Place ten cords (of brass coated wire) approximately 7" in length equally spaced on top of the two piece assembly.
6. Invert another 2 ply assembly, made as in items 1, 2 and 3, on top of cords so that cords are between 2 layers of stock to be tested.
7. This assembly should now fit snugly into the mold.
8. Adhesion pads shall be cured for 30 minutes at 300° F. and then allowed to equilibrate for 24 hours.
9. Testing Machine: 1130 Instron Universal Tester.
10. Test speed 10"/minute; temperature 230° F. after 20' preheat.
11. The top grip shall be of a special holder made for the cured sample, with a slot in the bottom to permit the sample to be inserted with the wire protruding. The bottom grip shall be a wedge type, designed to exert increasing tightening as the wire is pulled.
12. Record 10 pulls and average. Multiply by 2 to get lbs. per inch.

The preceding Examples can be varied within the scope of our total specification disclosure, as it would be understood and practiced by one skilled in the art, to achieve essentially the same results. Equivalent reactants can be used.

When our skim stock is used in the conventional steel cord tire construction, for example, it is extremely important that the bond between the rubber ply stock and the wire fabric also be as flexible and as strong as possible for efficient use under operating conditions; this is especially important in the case of truck tires which are subjected to high loads and speeds with consequent heat buildup due to the rapid flexing of the plies.

The rubber to be used in the practice of this invention includes vulcanizable rubbers. Rubbers that can be utilized include natural rubbers, synthetic rubbers, polyisoprene, polybutadiene, copolymers of butadiene and styrene and the like, and blends thereof. The particular rubber composition selected is preferably a blend of natural rubber and polybutadiene. An extender oil, when utilized, can be, for example, any known medium process oil, aromatic or naphthenic hydrocarbon derived.

The antioxidant selected can be, for example, N-(1,3-dimethyl butyl)-N'-phenyl-p-phenylenediamine, known in the trade as Santoflex 13; or other phenyl-p-phenylenediamine derivatives.

The accelerator preferably utilized in the practice of our invention is N-oxydiethylene benzothiazole-2-sulfenamide; this accelerator is commercially available from American Cyanamid and is known as NOBS Special. Other accelerators such as N-t-butyl-2-benzothiazole-sulfenamide can also be utilized; the particular accelerator selected is not critical.

Any known rubber reinforcing carbon black can be used, such as the known FEF, ISAF and other carbon blacks. Curing is preferably achieved through use of sulfur as a sulfur/oil blend preferably utilized at a ratio of 80/20. The use of FEF carbon black is preferred. Curing can also be achieved through known peroxide or irradiation means.

Compounding ingredients customarily employed in the rubber compounding art can be added to our skim stock composition and include accelerators, antioxidants, bactericides and the like, color pigments, extenders, reinforcing pigments, softeners, vulcanizing agents, etc. The compounding ingredients are used in the amounts necessary to achieve the desired properties in the resulting vulcanizate as is well known to those skilled in the art.

The skim stock of the present invention can be applied by use of calendering means, spray means or other known application techniques. Areas of significant utility include, but are not limited to, radiator hose, pneumatic tires, air ride springs, metal reinforced products such as rubber bumpers and sporting goods grips such as golf club handles, in each of these representative areas of utility, the skim stock composition can be used to increase adhesion and adhesion retention properties between metal and rubber, including use in operation when bright steel surfaces are present.

When the skim stock of this invention is used in steel cord tire construction, for example, it is extremely important, both in new tire construction and retread or repair operations, that the bond between the rubber ply stock and the wire fabric be as flexible and as strong as possible for efficient use under operation conditions; this is especially important in the case of truck tires which are subjected to high loads and speeds with consequent heat buildup due to the rapid flexing of the plies.

The present invention also finds utility in, for example, metal-rubber articles such as motor mounts, cutless bearings, torsilastic springs, power belts, printing rolls, metal wire reinforced or braided hose, electrical deicers, shoe heels, and wherever it is desired to secure rubber to plated or unplated metal to provide a flexible and strong bond between the same.

The coated wire utilized in the practice of our invention can be, for example, brass plated wire, i.e., 70% Cu, 30% Zn steel. The wire can be in the form of a strand, mat, web, ply or braid.

We claim:

1. In a cured rubber skim stock of conventional composition, said stock being bonded to at least one brassed metal member contained within said stock, the improvement wherein about 0.5 to about 15 parts per hundred parts rubber of a sulfide of copper is incorporated into said stock prior to curing.

2. The composition of claim 1 having about 0.5 to about 15 phr of CuS as sulfide of copper.

3. The composition of claim 1 having about 2.0 to about 8.0 phr of CuS as sulfide of copper.

4. The composition of claim 1 having about 0.5 to about 15 phr of $Cu_2S$ as sulfide of copper.

5. The composition of claim 1 having about 2.0 to about 8.0 phr of $Cu_2S$ as sulfide of copper.

6. A composition according to claim 1 wherein said curing is achieved by vulcanization.

7. A tire having improved adhesion between a cured rubber skim stock of conventional composition, and, brassed metal reinforcing members imbedded therein, the improvement wherein about 0.5 to about 15 parts per hundred parts rubber of a sulfide of copper has been incorporated into said stock prior to curing.

8. A tire according to claim 7 wherein said curing is achieved by vulcanization.

9. The tire of claim 7 wherein said composition contains from about 0.5 to about 15 phr of $Cu_2S$ as sulfide of copper.

10. The tire of claim 7 wherein said composition contains from about 2.0 to about 8.0 phr of $Cu_2S$ as sulfide of copper.

11. The tire of claim 7 wherein said composition contains about 0.5 to about 15 phr of CuS as sulfide of copper.

12. The tire of claim 7 wherein said composition contains about 2.0 to about 8.0 phr of CuS as sulfide of copper.

* * * * *